(12) United States Patent
Langston et al.

(10) Patent No.: US 8,131,936 B2
(45) Date of Patent: Mar. 6, 2012

(54) METHOD AND APPARATUS FOR IMPLEMENTING A COMBINED DATA/COHERENCY CACHE

(75) Inventors: Keith N. Langston, Woodstock, NY (US); Pak-kin Mak, Poughkeepsie, NY (US); Bruce A. Wagar, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 11/056,809

(22) Filed: Feb. 11, 2005

(65) Prior Publication Data

US 2006/0184744 A1 Aug. 17, 2006

(51) Int. Cl.
*G06F 12/00* (2006.01)
(52) U.S. Cl. .. 711/128; 711/141; 711/136; 711/E12.027
(58) Field of Classification Search .................. 711/136, 711/141, 207, E12.027
See application file for complete search history.

(56) References Cited

U.S. PATENT DOCUMENTS

| | | | | |
|---|---|---|---|---|
| 4,513,367 A | * | 4/1985 | Chan et al. ..................... | 711/145 |
| 4,719,568 A | * | 1/1988 | Carrubba et al. .............. | 711/123 |
| 4,785,395 A | * | 11/1988 | Keeley ........................... | 711/122 |
| 5,684,976 A | * | 11/1997 | Soheili-Arasi et al. ........ | 711/128 |

FOREIGN PATENT DOCUMENTS

EP 0507063 7/1992

OTHER PUBLICATIONS

Issues in Multi-Level Cache Designs, Lishing Liu, IEEE Proceedings of the International Conference on Computer Design: VLSI in Computers and Processors, Oct. 10-12, 1994. pp. 46-52.
IBM Technical Disclosure Bulletin, "Extended L2 Directory for L1 Residence Recording", vol. 34, No. 8, Jan. 1992, pp. 130-133.
Issues in Multi-Level Cache Designs, Lishing Liu, IEEE Proceedings of the International Conference on Computer Design: VLSI in Computers and Processors, Oct. 10-12, 1994. pp. 46-52.
IBM Technical Disclosure Bulletin, "Extended L2 Directory for L1 Residence Recording", vol. 34, No. 8, Jan. 1992, pp. 130-133.

* cited by examiner

*Primary Examiner* — Reginald Bragdon
*Assistant Examiner* — Victor Wang
(74) *Attorney, Agent, or Firm* — Cantor Colburn LLP; John Campbell

(57) ABSTRACT

A method and apparatus for implementing a combined data/coherency cache for a shared memory multi-processor. The combined data/coherency cache includes a system cache with a number of entries. The method includes building a system cache directory with a number of entries equal to the number of entries of the system cache. The building includes designating a number of sub-entries for each entry which is determined by a number of sub-entries operable for performing system cache coherency functions. The building also includes providing a sub-entry logic designator for each entry, and mapping one of the sub-entries for each entry to the system cache via the sub-entry logic designator.

15 Claims, 4 Drawing Sheets

METHOD AND APPARATUS FOR IMPLEMENTING A COMBINED DATA/COHERENCY CACHE

BACKGROUND OF THE INVENTION

1. Field of the Invention

This invention relates to data caches, and particularly to a method and apparatus for implementing a combined data/coherency cache.

2. Description of Background

In a large shared-memory multiprocessor, providing a system-level cache of the recently accessed contents of memory, along with an efficient means to handle system-wide cache coherency, can be accomplished with a single system cache directory array by requiring the contents of the respective processor-level caches to be a subset of the system cache. Unfortunately, when the combined size of the processor caches is sufficiently large, this subset rule can become impractical because of the resulting size of the system cache required to work effectively becomes too big. While one possible solution to this is to maintain two directories (one for the system cache, one for all the processor cache contents), this complicates the design significantly. Using two separate directories to accomplish the same task requires more logic, both to synchronize the contents of the two directories (either to keep them distinct, or to manage them if allowed to overlap), as well as to carry out any system memory access (which requires looking up both directories and taking the appropriate action in each).

What is needed, therefore, is a single system cache directory that is large enough to contain all the processor cache directory entries, but with only sufficient system cache to back the most recent fraction of data accessed by the processors.

SUMMARY OF THE INVENTION

The shortcomings of the prior art are overcome and additional advantages are provided through the provision of a method and apparatus for implementing a combined data/coherency cache for a shared memory multi-processor. The combined data/coherency cache includes a system cache with a number of entries.

The method includes building a system cache directory with a number of entries equal to the number of entries of the system cache. The building includes designating a number of sub-entries for each entry, which is determined by a number of sub-entries operable for performing system cache coherency functions. The building also includes providing a sub-entry logic designator for each entry, and mapping one of the sub-entries for each entry to the system cache via the sub-entry logic designator.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In accordance with exemplary embodiments, a single system cache directory and system level cache for a shared memory multi-processor is provided. The system cache directory is sufficient in size to contain the entries of all underlying processor cache directories. The system cache is sized commensurate given limitations such as desired access time and reasonable chip area. The most recent fraction of the system cache directory entries are mapped into the system cache. This structure behaves both as a cache (for recently accessed memory data needed by the processors) and a system-wide cache coherency controller (by maintaining a record of which processors have copies of which portions of memory and what state they are in). By using a single directory, the job of both cache management and cache coherency management can be maintained with one look-up and set of resulting actions.

Figure 1:
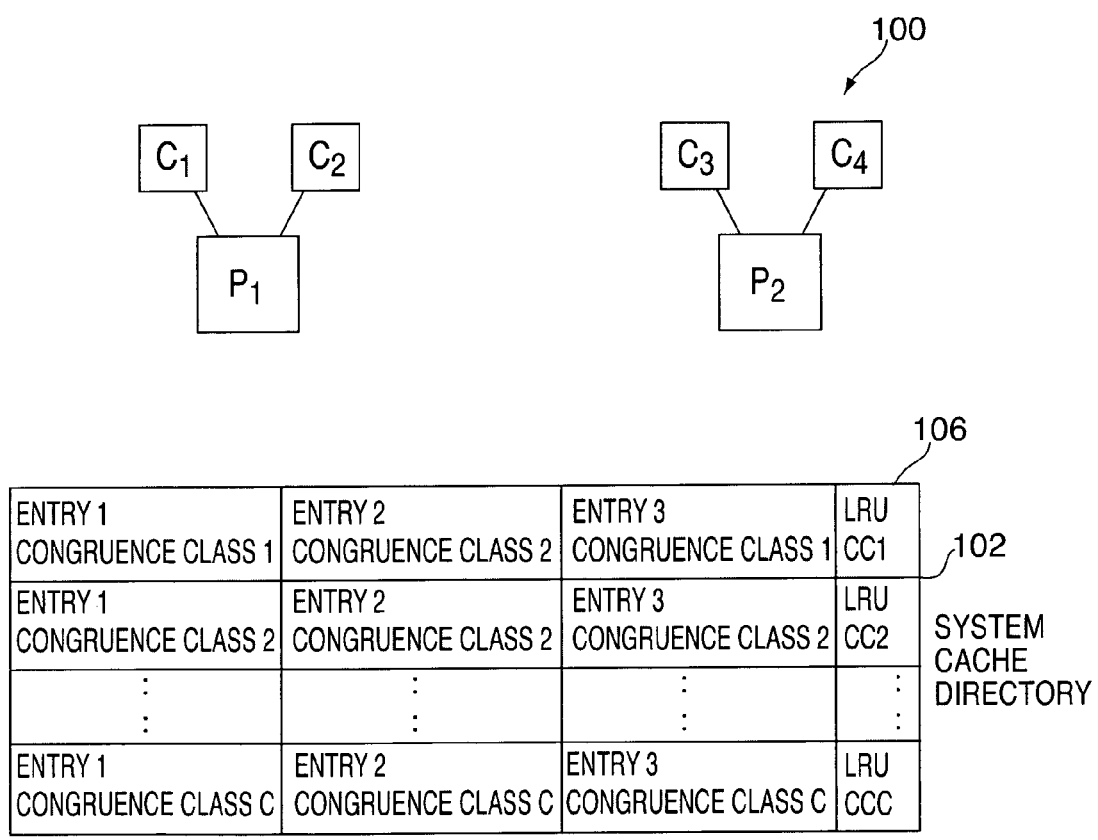
FIG. 1 is a system diagram of a shared memory multi-processor utilizing a system cache structure in the prior art.

For background purposes, a shared-memory multiprocessor system 100 including system cache and directory components utilized in the prior art will now be described with respect to FIG. 1. In the shared memory multi-processor environment of FIG. 1, each of the processors $P_1$ and $P_2$ has its own set of processor caches ($C_1$ and $C_2$ for $P_1$, and $C_3$ and $C_4$ for $P_2$), which contain copies of the instructions and data of recent work performed on the processor. It will be understood that any number of processors and processor caches may be included in the system 100 of FIG. 1. In order to work efficiently in such an environment, a system control structure is utilized for controlling resource access, ensure cache coherency, etc. This system control structure may be multi-level; however, a single level is described herein for purposes of illustration. It will be understood that extensions to multiple levels may be implemented in a manner analogous to the single level implementation.

System control structures include two elements: a system cache and system cache coherency. A system cache, similar to the processor caches, is a cache of all the recent instructions and data of all the processors under control of this system. It performs two key roles: resupplies data to a processor cache when such data ages out or is otherwise removed from the processor cache, and provides data to other processors (possibly via other system caches), when they need access to it.

System cache coherency involves recordkeeping. Oftentimes, memory cannot be accessed every time it is needed or changed because the access time is too great relative to the speed of the processors. Consequently, the job of maintaining a single, coherent, view of memory to the processors (e.g., $P_1$, $P_2$) via their respective processor caches (e.g., $C_1$-$C_4$) falls on the system control structure via the system cache directory 102. By maintaining a record of which processors ($P_1$, $P_2$) have cached which portions of memory they are actively using, the system control can take the appropriate action when another processor needs to access the same parts of memory.

Obviously, if the system cache can be built sufficiently large enough to accomplish both tasks (by requiring all processor cache contents to be part of the system cache contents, otherwise known as the subset rule), there is no problem. But if such a cache is too large for practical reasons, a redesign of the system may be required or perhaps a system cache is not utilized. Alternatively, a subset rule may be utilized that effectively limits a significant portion of the processor caches available to the processors, or having two separate system cache directories (i.e., one to manage the cache and one to manage the cache coherency) as well as the resulting complexity required to make it work.

By way of example, suppose the system cache is comprised of $N=C*A$ entries, where C represents the number of congruence classes (where each of the congruence classes represents a set of addresses of memory corresponding to one of C possible values), and A represents the associativity of each congruence class (the number of cache entries that can share the same address mapping used to select the congruence class).

Typical computer cache designs have such a structure, along with a corresponding cache directory (e.g., 102) with a similar $C*A$ structure, whereby each directory entry represents the corresponding cache entry and contains such information as the memory address of the cache entry, the last processor to access the data, and whether the data has been changed with respect to the memory contents. Lastly, some form of LRU (least recently used) logic (e.g., logic column 106) is present for each congruence class to manage the entries within that congruence class from least recently used to most recently used (MRU). The two most prevalent uses of LRU logic are update and install.

An update is performed by looking up and finding an address in a directory, typically making it the MRU entry and displacing all those entries that stand in between it and the MRU position. An install is performed when an address is not found in a directory, whereby a place is cleared for it. This time the LRU entry is chosen and replaced with the new entry, then making the new entry the MRU.

Figure 2:
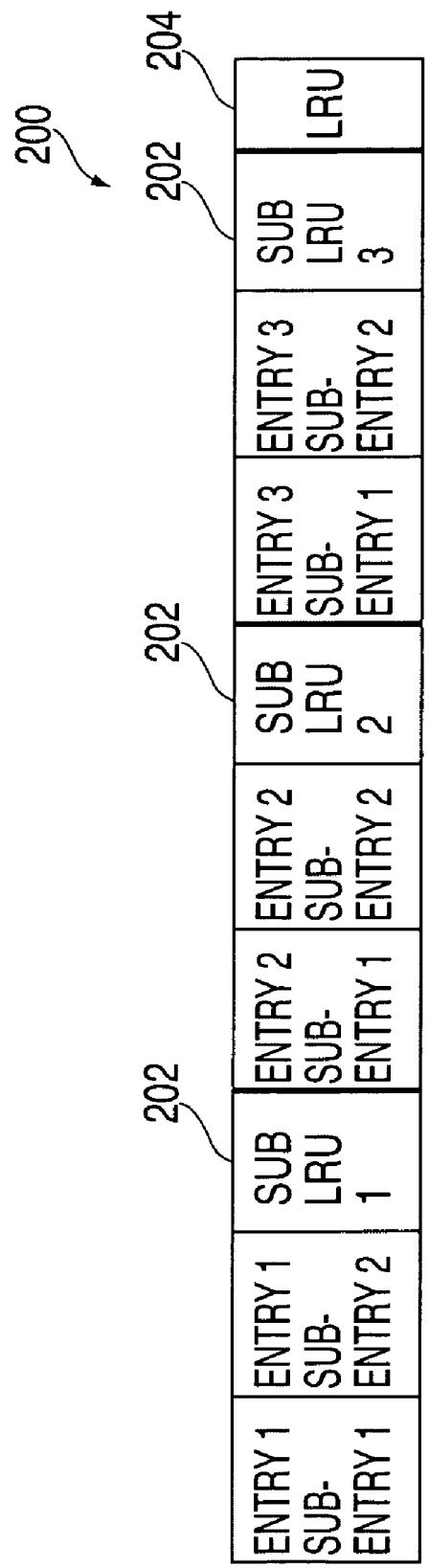
FIG. 2 is a modified congruence class utilized by the combined data/coherency cache in exemplary embodiments.

In accordance with exemplary embodiments, a combined data/coherency cache structure is provided that utilizes a single system cache of practical size, where only the most recent entries in the directory have corresponding entries in the cache. Turning now to FIG. 2, a modified congruence class 200 for implementing the combined data/coherency cache will now be described. Continuing with the example cache system 100 described in FIG. 1, it is assumed that a number of entries 'N' are insufficient to provide efficient system cache coherency, although 2*N entries are sufficient. The system cache may be kept to N entries, however each system cache directory entry may be widened to contain two separate addresses (e.g., sub 1 or sub 2) along with corresponding logic (referred to herein as a sub-entry logic designator 202) for determining which address represents the corresponding cache entry for this system cache directory entry. In a sense, there are two sub-entries (e.g., Sub-entries 1 and 2) per directory entry (e.g., Entry 1) as shown in the modified congruence class 200 of FIG. 2. Only one of these sub-entries for each entry will have a corresponding cache entry. It will be understood that, with a little more logic, this concept may be extended to any multiple $M*N$ entries, essentially adding a simple M-way LRU logic (a sub-LRU logic) to each entry (M sub-entries) in the cache directory.

Figure 3A:
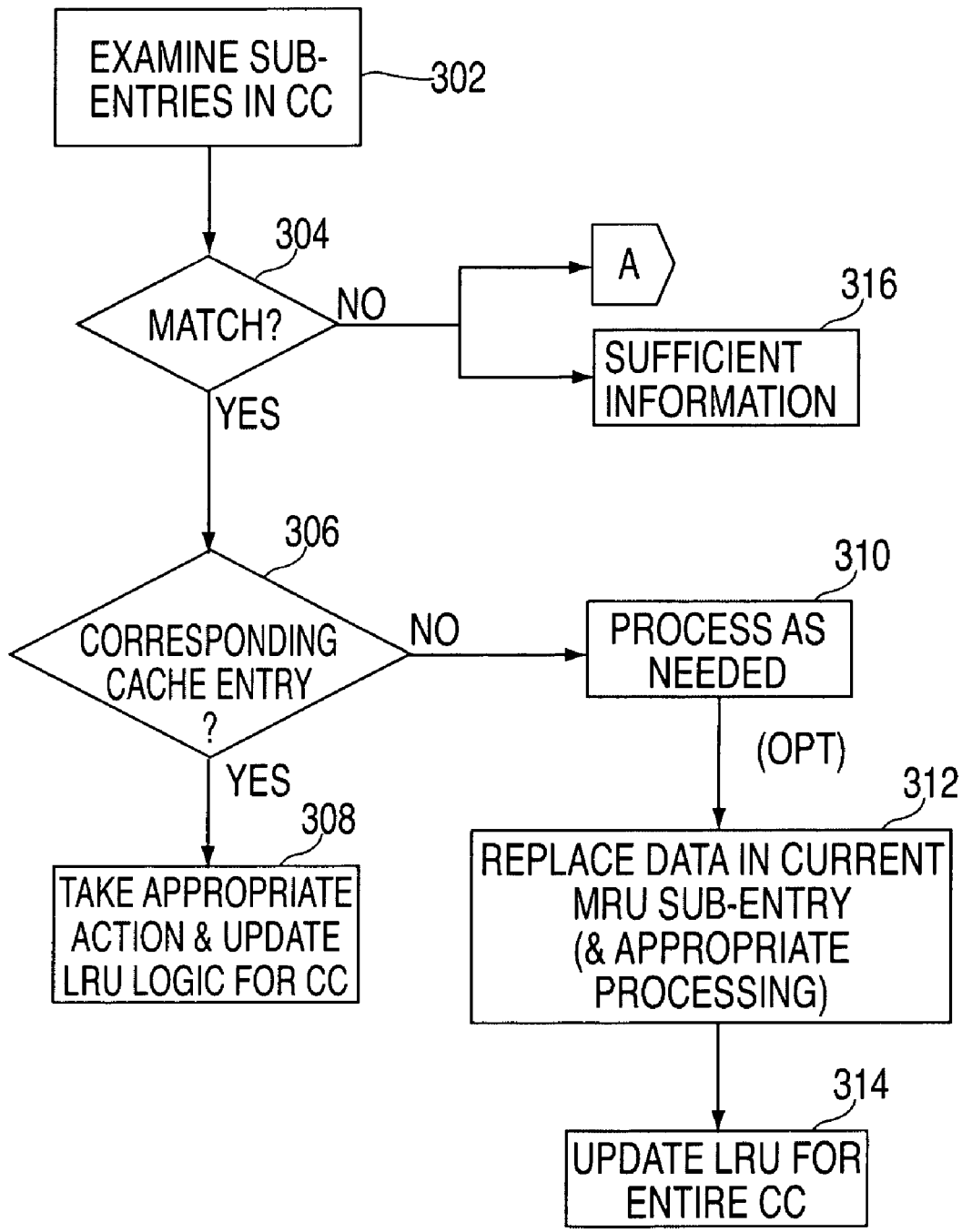
FIG. 3A-3B is a flow diagram describing a process for performing look-up and install procedures via the combined data/coherency cache structure in exemplary embodiments.
Figure 3B:
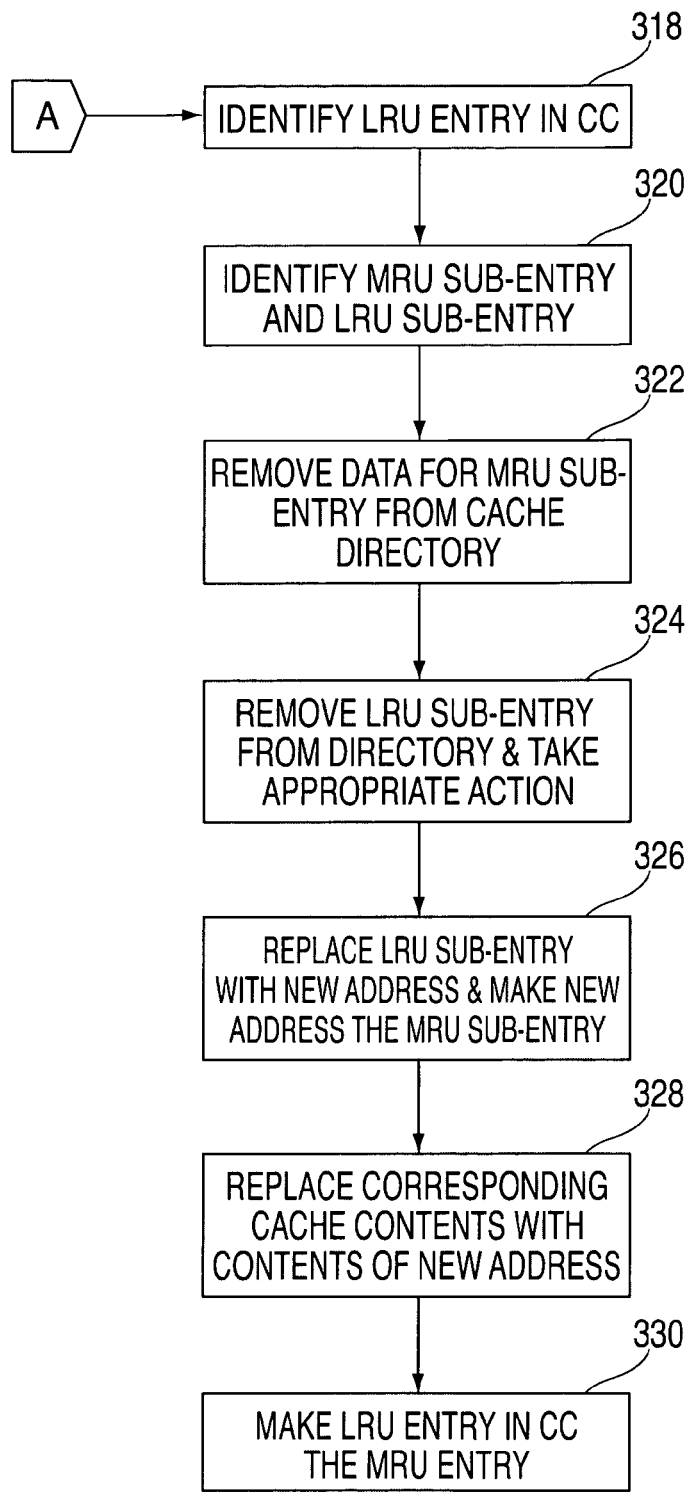

The single cache directory of the combined data/coherency cache system performs both roles updates and installs as will now be described in the flow diagram of FIG. 3A-3B. When looking up a particular address, all sub-entries in the appropriate congruence class (e.g., 200) are examined to find a possible match at step 302. If found (step 304), and if that particular sub-entry is one that has a corresponding cache entry (step 306), this indicates that its data is available in the cache. Appropriate action is taken (e.g., supply data to a processor cache) and the corresponding congruence class has its LRU logic (e.g., logic column 204) updated accordingly at step 308. If found (step 304), but the sub-entry is not one with a corresponding cache entry (step 306), the directory information may be used to do whatever processing is needed at step 310. If the data has to be put in the corresponding cache entry (and sub-LRU logic designator updated), the current MRU sub-entry has its data replaced (along with any other necessary processing, such as writing the data back to memory if it differs from the memory copy) at step 312, and the entire congruence class has its LRU logic (e.g., logic in column 204) updated at step 314 (e.g., as with a typical cache install). Turning back to step 304, if the address does not match any sub-entry, this indicates that either sufficient information is provided at step 316, or the data needs to be installed and the process, proceeds to FIG. 3B.

At step 318, the LRU entry (e.g., one of entries 1-3) in the congruence class 200 is identified. Within this entry, the MRU sub-entry and LRU sub-entry (e.g., one of sub-entries 1-2) are identified at step 320. The MRU sub-entry is to have its corresponding data removed from the cache directory at step 322. Appropriate action is taken for this cache data (e.g., writing it back to memory if it differs from the memory copy).

The LRU sub-entry (e.g., one of sub-entries 1-2 associated with the sub-entry logic designator identified above) is removed from the directory and any appropriate action is taken in the underlying processor caches (e.g., invalidate their copies) at step 324. The LRU sub-entry is replaced with the new address and the new address is made to be the MRU sub-entry at step 326.

At step 328, the corresponding cache contents are replaced with that of the new address. The LRU entry (one of entries associated with the LRU in column 204) in the congruence class is made the MRU entry to complete the install procedure at step 330.

As described above, a means for constructing a single structure that performs both the role of system cache (data) and system control (coherency) is provided in cases where the size of the system cache is insufficient to contain the contents of all of the underlying caches. While other solutions exist for this problem, such as multiple structures (extra complexity), or relaxed subset rules (extra overhead on the underlying caches to manage the coherency), or no data cache (and thus, no fast central access to recently accessed data), none are able to deliver the advantages and simplicity of the combined data/coherency cache.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for implementing a combined data/coherency cache for a shared memory multi-processor, the combined data/coherency cache including a system cache with a number of entries, the method comprising:
    utilizing a system cache directory with a number of directory entries equal to the number of cache entries of the system cache, the utilizing comprising:
    designating two or more sub-entries for each directory entry, each of the sub-entries having a separate address, and only one of the two or more sub-entries for each directory entry includes a corresponding cache entry, wherein only one of the sub-entries for each directory entry indicates that data is available in the corresponding cache entry responsive to matching a requesting address to one of the separate addresses, the number of sub-entries determined by a multiple of the number of directory entries;
    wherein each directory entry comprises a corresponding sub-entry logic designator; and
    mapping one of the sub-entries for each directory entry to the system cache via the sub-entry logic designator, the sub-entry logic designator comprising a least recently used (LRU) logic designator, the LRU logic designator indicating which of the two or more sub-entries within the corresponding directory entry is least recently used.

2. The method of claim 1, wherein the number of directory entries in the system cache is determined by a number of congruence classes associated with the system cache multiplied by associativity of each of the congruence classes.

3. The method of claim 1, further comprising examining sub-entries in the system cache directory for an address, the examining performed in conjunction with a look up operation, the method further comprising:
    in response to finding the address in one of the sub-entries, performing at least one of:
        updating the sub-entry logic designator of the corresponding directory entry for this sub-entry; and
        processing the one of the sub-entries utilizing in accordance with the look up operation.

4. The method of claim 1, further comprising examining sub-entries in the system cache directory for an address, the examining performed in conjunction with a look up operation, the method further comprising:
    in response to not finding the address in one of the sub-entries, installing data corresponding to the look up operation.

5. The method of claim 4, wherein the installing comprises:
    identifying a logic column comprising a least recently used logic corresponding to a congruence class associated with the address;
    identifying a most recently used sub-entry and a least recently used sub-entry for the directory entry corresponding to the least recently used logic;
    removing the least recently used sub-entry from the system cache directory and replacing the least recently used sub-entry with the address;
    replacing system cache entry contents associated with the most recently used sub-entry with data associated with the address; and
    applying a most recently used designator to the least recently used entry in the congruence class; and
    applying a most recently used designator to the newly-installed sub-entry with the address.

6. A combined data/coherency cache structure for providing cache functions and system-wide cache coherency functions for a shared-memory multiprocessor, the combined data/coherency cache structure comprising:
    a system cache including a number of cache entries;
    a system cache directory including a number of directory entries equal to the number of cache entries in the system cache;
    two or more sub-entries associated with each directory entry of the system cache directory, each of the sub-entries having a separate cache address, and only one of the two or more sub-entries for each directory entry includes a corresponding cache entry, wherein only one of the sub-entries for each directory entry indicates that data is available in the corresponding cache entry responsive to matching a requesting address to one of the separate addresses, the number of sub-entries determined by a number of sub-entries commensurate with performing system cache coherency functions; and
    wherein each directory entry comprises a corresponding sub-entry logic designator;
    wherein one of the sub-entries for each directory entry in the system cache directory is mapped to the system cache via the sub-entry logic designator, the sub-entry logic designator comprising a least recently used (LRU) logic designator, the LRU logic designator indicating which of the two or more sub-entries within the corresponding directory entry is least recently used.

7. The combined data/coherency cache structure of claim 6, wherein the number of directory entries in the system cache is determined by a number of congruence classes associated with the system cache multiplied by associativity of each of the congruence classes.

8. The combined data/coherency cache structure of claim 6, wherein a look up operation is performed, the look up operation accomplished by:
    examining sub-entries in the system cache directory for an address; and
    in response to finding the address in one of the sub-entries, performing at least one of:
        updating the sub-entry logic designator of the corresponding directory entry for this sub-entry; and
        processing the one of the sub-entries utilizing in accordance with the look up operation.

9. The combined data/coherency cache structure of claim 6, wherein a look up operation is performed, the look up operation accomplished by:
  examining sub-entries in the system cache directory for an address; and
  in response to not finding the address in one of the sub-entries, installing data corresponding to the look up operation.

10. The combined data/coherency cache structure of claim 9, wherein the installing comprises:
  identifying a logic column comprising a least recently used logic designator corresponding to a congruence class associated with the address;
  identifying a most recently used sub-entry and a least recently used sub-entry for the directory entry corresponding to the least recently used logic designator;
  removing the least recently used sub-entry from the system cache directory and replacing the least recently used sub-entry with the address;
  replacing system cache entry contents associated with the most recently used sub-entry with data associated with the address;
  applying a most recently used designator to the least recently used entry in the congruence class; and
  applying a most recently used designator to the newly-installed sub-entry with the address.

11. A non-transitory computer readable medium encoded with a computer program for implementing a combined data/coherency cache for a shared memory multi-processor, the combined data/coherency cache including a system cache with a number of entries, the computer program including instructions that, when executed by a computer, cause the computer to perform a method, comprising:
  utilizing a system cache directory with a number of directory entries equal to the number of cache entries of the system cache, the utilizing comprising:
  designating two or more sub-entries for each directory entry, each of the sub-entries having a separate cache address, and only one of the two or more sub-entries for each directory entry includes a corresponding cache entry, wherein only one of the sub-entries for each directory entry indicates that data is available in the corresponding cache entry responsive to matching a requesting address to one of the separate addresses, the number of sub-entries determined by a multiple of the number of directory entries;
  wherein each directory entry comprises a corresponding sub-entry logic designator; and
  mapping one of the sub-entries for each directory entry to the system cache via the sub-entry logic designator, the sub-entry logic designator comprising a least recently used (LRU) logic designator, the LRU logic designator indicating which of the two or more sub-entries within the corresponding directory entry is least recently used.

12. The non-transitory computer readable medium of claim 11, wherein the number of directory entries in the system cache is determined by a number of congruence classes associated with the system cache multiplied by associativity of each of the congruence classes.

13. The non-transitory computer readable medium of claim 11, wherein the computer program further includes instructions for examining sub-entries in the system cache directory for an address, the examining performed in conjunction with a look up operation, the instructions, when executed on the computer, causing the computer to perform the method further comprising:
  in response to finding the address in one of the sub-entries, performing at least one of:
    updating the sub-entry logic designator of the corresponding directory entry for this sub-entry; and
    processing the one of the sub-entries utilizing in accordance with the look up operation.

14. The non-transitory computer readable medium of claim 11, wherein the computer program further includes instructions for examining sub-entries in the system cache directory for an address, the examining performed in conjunction with a look up operation, the instructions, when executed on the computer, causing the computer to perform the method further comprising:
  in response to not finding the address in one of the sub-entries, installing data corresponding to the look up operation.

15. The non-transitory computer readable medium of claim 14, wherein the installing comprises:
  identifying a logic column comprising a least recently used logic designator corresponding to a congruence class associated with the address;
  identifying a most recently used sub-entry and a least recently used sub-entry for the directory entry corresponding to the least recently used logic designator;
  removing the least recently used sub-entry from the system cache directory and replacing the least recently used sub-entry with the address;
  replacing system cache entry contents associated with the most recently used sub-entry with data associated with the address;
  applying a most recently used designator to the least recently used entry in the congruence class; and
  applying a most recently used designator to the newly-installed sub-entry with the address.

* * * * *